(12) United States Patent
Wang et al.

(10) Patent No.: US 11,388,229 B2
(45) Date of Patent: Jul. 12, 2022

(54) METHODS AND APPARATUSES FOR TRANSMITTING MESSAGES

(71) Applicant: ALIPAY (HANGZHOU) INFORMATION TECHNOLOGY CO., LTD., Zhejiang (CN)

(72) Inventors: Jiang Wang, Hangzhou (CN); Chao Zeng, Hangzhou (CN); He Sun, Hangzhou (CN)

(73) Assignee: Alipay (Hangzhou) Information Technology Co., Ltd.

( * ) Notice: Subject to any disclaimer, the term of this patent is extended or adjusted under 35 U.S.C. 154(b) by 0 days.

(21) Appl. No.: 17/362,867

(22) Filed: Jun. 29, 2021

(65) Prior Publication Data

US 2021/0329065 A1      Oct. 21, 2021

(30) Foreign Application Priority Data

Sep. 25, 2020   (CN) .......................... 202011019946.4

(51) Int. Cl.
*H04L 67/1074*   (2022.01)
*H04L 67/104*    (2022.01)
(Continued)

(52) U.S. Cl.
CPC ........ *H04L 67/108* (2013.01); *H04L 67/1053* (2013.01); *H04L 67/1076* (2013.01);
(Continued)

(58) Field of Classification Search
CPC ......... H04L 12/58; H04L 29/08; H04L 25/20; H04L 12/865; H04L 67/108;
(Continued)

(56) References Cited

U.S. PATENT DOCUMENTS 10,417,217 B2    9/2019  Pierce et al.
10,616,324 B1 *  4/2020  Kaddoura ............. H04L 69/329
(Continued)

FOREIGN PATENT DOCUMENTS

CN      1599350       3/2005
CN      102769889     11/2012
(Continued)

OTHER PUBLICATIONS

Bitcoinfibre.Org [online], "Fibre," available no later than Jul. 2016, retrieved on Aug. 24, 2021, retrieved from URL<https://bitcoinfibre.org/>, 4 pages.

(Continued)

*Primary Examiner* — Aftab N. Khan
(74) *Attorney, Agent, or Firm* — Fish & Richardson P.C.

(57) ABSTRACT

One or more embodiments of this specification provide methods and apparatuses for transmitting messages. A method includes: determining a blockchain message from two or more message queues stored in a relay node in a blockchain relay communication network based on a message transmission policy, the message transmission policy being configured to transmit blockchain messages in the blockchain relay communication network based upon a priority identifier representing a priority of a blockchain message to be transmitted in the blockchain relay communication network; obtaining identifier from the blockchain message, and determining one or more target blockchain nodes in the blockchain relay communication network corresponding to the identifier; determining a target relay node connected to the one or more target blockchain nodes in the blockchain relay communication network; and transmitting the blockchain message to the one or more target blockchain nodes through the target relay node.

17 Claims, 5 Drawing Sheets

(51) Int. Cl.
*G06Q 20/06* (2012.01)
*H04L 9/40* (2022.01)

(52) U.S. Cl.
CPC ........ *G06Q 20/065* (2013.01); *H04L 63/0884* (2013.01); *H04L 2209/38* (2013.01)

(58) Field of Classification Search
CPC ... H04L 67/1053; H04L 67/1076; G06F 9/54; G06F 16/13
See application file for complete search history.

(56) References Cited

U.S. PATENT DOCUMENTS

| | | | |
|---|---|---|---|
| 10,757,084 B1 | 8/2020 | Yu | |
| 2014/0022902 A1 | 1/2014 | Uppunda et al. | |
| 2017/0352027 A1 | 12/2017 | Zhang et al. | |
| 2018/0212970 A1 | 7/2018 | Chen et al. | |
| 2019/0082007 A1 | 3/2019 | Klarman et al. | |
| 2020/0125738 A1* | 4/2020 | Mahatwo | G06F 21/64 |
| 2020/0177517 A1* | 6/2020 | Pancras | H04L 47/6295 |
| 2020/0177572 A1 | 6/2020 | Qui | |
| 2020/0210413 A1* | 7/2020 | Quick | G06F 16/9024 |
| 2020/0241981 A1* | 7/2020 | Ding | H04L 67/1051 |
| 2021/0135901 A1* | 5/2021 | Xie | H04L 12/46 |
| 2021/0176038 A1* | 6/2021 | Bortnikov | G06F 21/602 |
| 2021/0297265 A1* | 9/2021 | Huang | H04L 9/0637 |

FOREIGN PATENT DOCUMENTS

| | | | | |
|---|---|---|---|---|
| CN | 103533569 | | 1/2014 | |
| CN | 103916423 | | 7/2014 | |
| CN | 104753980 | | 7/2015 | |
| CN | 105306232 | | 2/2016 | |
| CN | 107231299 | | 10/2017 | |
| CN | 107800795 | | 3/2018 | |
| CN | 107846718 | | 3/2018 | |
| CN | 108829749 | | 11/2018 | |
| CN | 109039847 | | 12/2018 | |
| CN | 109635165 | | 4/2019 | |
| CN | 109639550 | | 4/2019 | |
| CN | 109784881 | | 5/2019 | |
| CN | 109996306 | | 7/2019 | |
| CN | 110071876 | | 7/2019 | |
| CN | 110609755 | * | 8/2019 | ............... G06F 9/54 |
| CN | 110445882 | | 11/2019 | |
| CN | 110474846 | | 11/2019 | |
| CN | 110535647 | | 12/2019 | |
| CN | 110602201 | | 12/2019 | |
| CN | 110650189 | | 1/2020 | |
| CN | 110737664 | | 1/2020 | |
| CN | 110741400 | | 1/2020 | |
| CN | 111245745 | * | 1/2020 | ........... H04L 12/865 |
| CN | 110751475 | | 2/2020 | |
| CN | 111066286 | | 4/2020 | |
| CN | 111132258 | | 5/2020 | |
| CN | 111245745 | | 6/2020 | |
| CN | 111277549 | | 6/2020 | |
| CN | 111277562 | | 6/2020 | |
| CN | 111353175 | | 6/2020 | |
| CN | 111432011 | | 7/2020 | |
| CN | 111447290 | | 7/2020 | |
| CN | 111522833 | | 8/2020 | |
| CN | 113079081 | * | 9/2020 | ............. H04L 12/58 |
| EP | 3547168 | | 10/2019 | |
| KR | 20180129028 | | 12/2018 | |
| WO | WO2013094001 | | 4/2015 | |

OTHER PUBLICATIONS

Bitcoinrelaynetwork.org [online], "The Bitcoin Relay Network," available no later than Jun. 28, 2015, retrieved on Aug. 24, 2021, retrieved from URL<bitcoinrelaynetwork.org/>, 3 pages.

Bloxroute.com [online], "BloxRoute," available on or before Dec. 2017, retrieved on Aug. 24, 2021, retrieved from URL<https://bloxroute.com/>, 8 pages.

Crosby et al., "BlockChain Technology: Beyond Bitcoin," Sutardja Center for Entrepreneurship & Technology Technical Report, Oct. 16, 2015, 35 pages.

Falcon-net.org [online], "Falcon," available on or before Jun. 9, 2016, via Internet Archive: Wayback Machine URL<https://web.archive.org/web/20160609081540/https://www.falcon-net.org/>, retrieved on Aug. 24, 2021, URL<https://www.falcon-net.org/>, 4 pages.

Nakamoto, "Bitcoin: A Peer-to-Peer Electronic Cash System," www.bitcoin.org, 2005, 9 pages.

Ye et al., "BitXHub: Side-relay Chain Based Heterogeneous Blockchain Interoperable Platform," Computer Science, Jun. 2020, 47(6): 294-302 (with English abstract).

Extended European Search Report in European Application No. 21182233.3, dated Dec. 7, 2021, 11 pages.

* cited by examiner

METHODS AND APPARATUSES FOR TRANSMITTING MESSAGES

CROSS-REFERENCE TO RELATED APPLICATIONS

This application claims priority to Chinese Patent Application No. 202011019946.4, filed on Sep. 25, 2020, which is hereby incorporated by reference in its entirety.

TECHNICAL FIELD

One or more embodiments of this specification relate to the field of blockchain technology, and in particular, to methods and apparatuses for transmitting messages.

BACKGROUND

The blockchain technology (also referred to as the distributed ledger technology) is a decentralized distributed database technology, featured by being decentralized, open, transparent, immutable, trustworthy, and the like, and is suitable for many application scenarios with high needs on data reliability.

SUMMARY

In view of this, one or more embodiments of this specification provide methods and apparatuses for transmitting messages.

To achieve the previously described objective, the one or more embodiments of this specification provide the following technical solutions.

According to a first aspect of the one or more embodiments of this specification, a method of transmitting messages is provided, and is applied to a relay node in a blockchain relay communication network, where the relay node includes two or more message queues, and the same message queue is used for storing blockchain messages having the same priority identifier, the priority identifier represents a priority of a message to be transmitted; and the method includes: obtaining a to-be-transmitted blockchain message from the message queues based on a message transmission policy, the message transmission policy is configured for transmitting a high-priority blockchain message first; obtaining identifier information included in the to-be-transmitted blockchain message, and determining a blockchain node corresponding to the identifier information as a target blockchain node corresponding to the to-be-transmitted blockchain message; determining a target relay node connected to the target blockchain node in the blockchain relay communication network; and transmitting the blockchain message to the target blockchain node through the target relay node.

According to a second aspect of the one or more embodiments of this specification, an apparatus for transmitting messages is provided, and is applied to a relay node in a blockchain relay communication network, where the relay node includes two or more message queues, and the same message queue is used for storing blockchain messages having the same priority identifier, the priority identifier represents a priority of a message to be transmitted; and the apparatus includes: an obtaining unit, configured to obtain a to-be-transmitted blockchain message from the message queues based on a message transmission policy, the message transmission policy is configured for transmitting a high-priority blockchain message first; the obtaining unit is also configured to: obtain identifier information included in the to-be-transmitted blockchain message, and determine a blockchain node corresponding to the identifier information as a target blockchain node corresponding to the to-be-transmitted blockchain message; a determining unit, configured to determine a target relay node connected to the target blockchain node in the blockchain relay communication network; and a transmission unit, configured to transmit the blockchain message to the target blockchain node through the target relay node.

According to a third aspect of the one or more embodiments of this specification, an electronic device is provided, including: a processor; and a memory configured to store processor executable instructions, where the processor executes the executable instructions to implement the method according to the first aspect.

According to a fourth aspect of the one or more embodiments of this specification, a computer-readable storage medium is provided to store computer instructions, where the instructions are executed by a processor to implement steps of the method in the first aspect.

DESCRIPTION OF THE EMBODIMENTS

Explanatory embodiments are described in detail herein, and examples of the explanatory embodiments are shown in the accompanying drawings. When the following description involves the accompanying drawings, unless otherwise indicated, the same numerals in different accompanying drawings represent the same or similar elements. The implementations described in the following explanatory embodiments are not all the implementations consistent with one or more embodiments of this specification, but are instead only examples of methods and apparatuses that are described in detail in the appended claims and that are consistent with some aspects of one or more embodiments of this specification.

It should be noted that in other embodiments, the steps of corresponding methods are not necessarily performed based on a sequence shown and described in this specification. In some other embodiments, the methods can include more or fewer steps than those described in this specification. In addition, a single step described in this specification can be divided into a plurality of steps for description in other embodiments, and a plurality of steps described in this specification can be combined into a single step for description in other embodiments.

Figure 1:
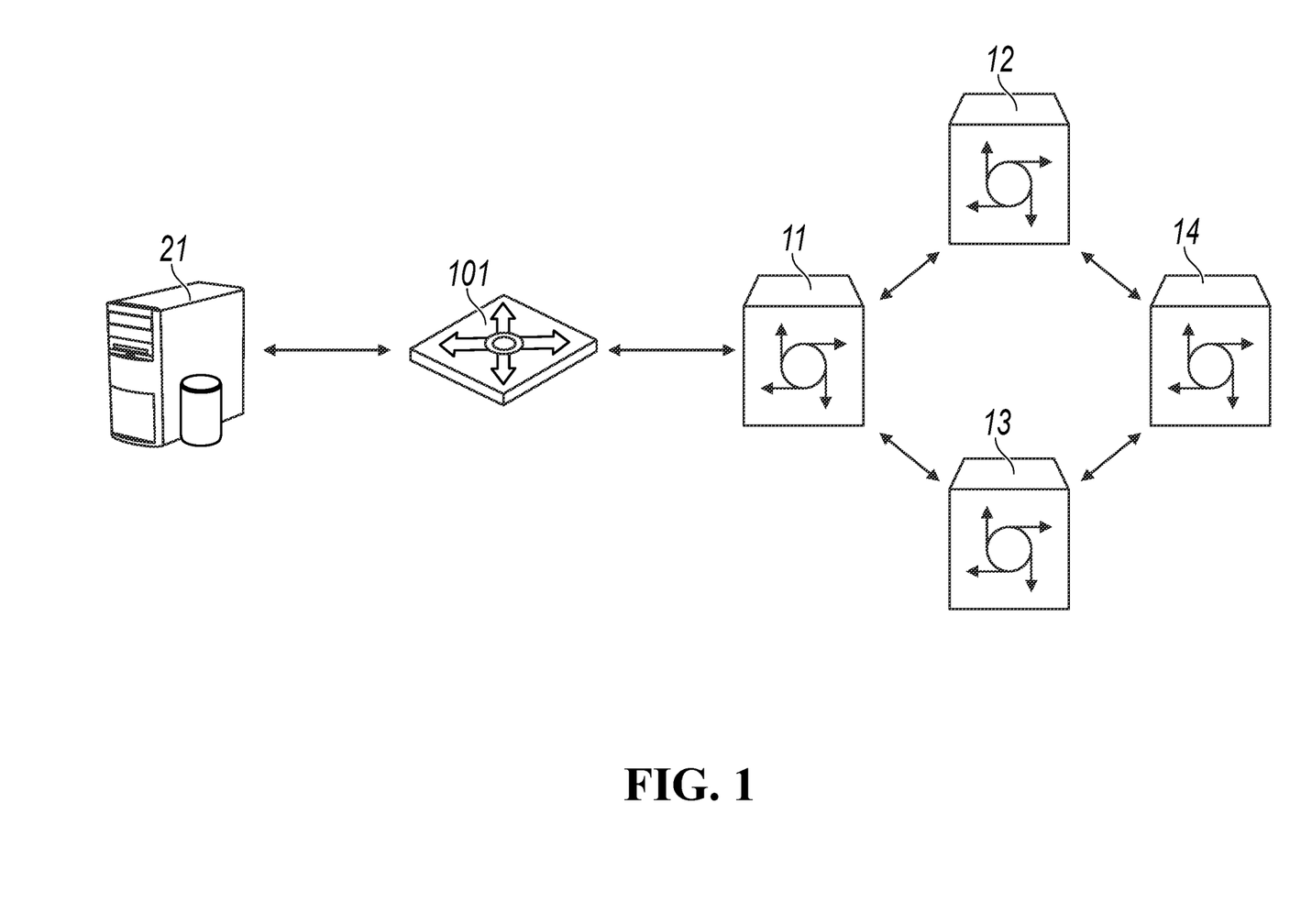
FIG. 1 is a schematic diagram showing interaction between a blockchain node and a blockchain relay communication network, according to an explanatory embodiment.

FIG. 1 is a schematic diagram showing interaction between a blockchain node and a blockchain relay communication network, according to an explanatory embodiment. As shown in FIG. 1, it is assumed that a blockchain relay communication network includes a plurality of relay nodes such as a relay 11, a relay 12, a relay 13, and a relay 14.

Taking the relay 11 as an example, the relay 11 can be connected to a node 21 in a blockchain network through a gateway 101. Similarly, other relay node(s) can also be connected to other blockchain node(s) in the blockchain network. The gateway 101 is configured to assist the node 21 to access the blockchain relay communication network. The gateway 101 is logically equivalent to a blockchain node in the blockchain network, but the gateway 101 does not participate in blockchain consensus. In this way, the node 21 can be communicated with the gateway 101 through a communication protocol adopted by the blockchain network, and the gateway 101 does not have a negative impact on processes such as the consensus process in the blockchain network. The gateway 101 is substantially an adaptation program for the node 21 to access the blockchain relay communication network. The adaptation program can be deployed on the node 21, the relay 11, or another device independent of the relay 11 and the node 21, and is not limited in this specification.

The blockchain network includes a plurality of blockchain nodes, and communication operations such as consensus, transaction transmission, and block synchronization need to be implemented between the blockchain nodes. In the related art, a peer-to-peer (P2P) technology is directly used for communication between the blockchain nodes to transmit transactions, blocks, or the like, but due to various network factors, a communication delay is high and a stability is poor, which cannot meet application needs. Therefore, similar to the node 21, each blockchain node can access the relay node in the blockchain relay communication network respectively. In this way, the blockchain nodes can communicate with each other through the blockchain relay communication network.

The blockchain relay communication network can be applied to various types of blockchain networks, including a public chain, a private chain, a consortium chain, or the like. For example, the blockchain relay communication networks applied to the public chains mainly include Falcon, Fast Bitcoin Relay Network (FBRN), Fast Internet Bitcoin Relay Engine (FIBRE), or the like, and the blockchain relay communication networks applied to the consortium chains mainly include BloXRoute, Blockchain Transmission Network (BTN), or the like.

Figure 2:
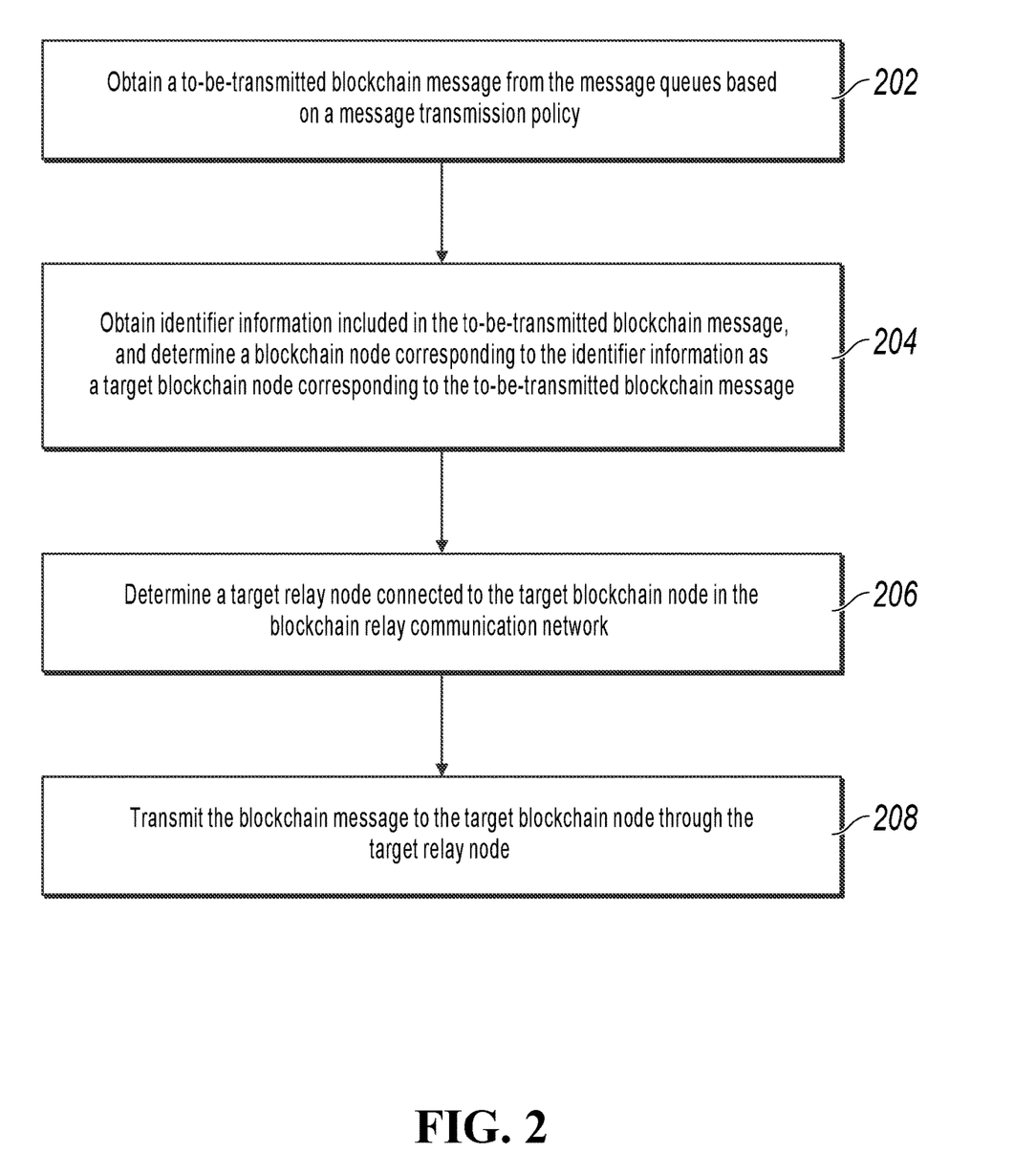
FIG. 2 is a flowchart of a method of transmitting messages, according to an explanatory embodiment.

FIG. 2 is a flowchart of a method of transmitting messages, according to an explanatory embodiment, the method is applied to a relay node in a blockchain relay communication network, where the relay node includes two or more message queues, and the same message queue is used for storing blockchain messages having the same priority identifier. Referring to FIG. 2, the method can include the following steps:

Step 202: obtaining a to-be-transmitted blockchain message from the message queues based on a message transmission policy.

A blockchain message can be, for example, a consensus message, a transaction broadcast message, and a synchronization message, etc. The blockchain message can be sent by a blockchain node, or can be sent by other relay node(s) in the blockchain relay communication network.

In this embodiment, message transmission is performed by using a plurality of message queues. When receiving a blockchain message, the relay node first adds the blockchain message to a corresponding message queue based on a priority identifier of the blockchain message, and then obtains a to-be-transmitted blockchain message from the message queues based on a message transmission policy, to transmit the to-be-transmitted blockchain message. The message transmission policy is configured for transmitting a high-priority blockchain message first.

The priority identifier of the blockchain message represents a priority of message transmission, and the priority identifier can be added to the blockchain message by using a gateway; or a blockchain node adds the priority identifier for the blockchain message; or a relay node adds the priority identifier for the blockchain message.

The priority identifier of a blockchain node can be determined based on a type of the message. For example, a consensus message has a relatively high requirement for real-time performance, while a transaction broadcast message and a synchronization message have relatively low requirements for real-time performance. Therefore, a priority set for the consensus message can be higher than priorities set for the transaction broadcast message and the synchronization message, to transmit the consensus message first. For the priority identifier of a blockchain message, the priority identifier can alternatively be configured for the blockchain message based on a user configuration instruction, so that a user can set a priority of the blockchain message based on an actual need.

When a blockchain message is received, the relay node can read a priority identifier from the blockchain message, and adds the blockchain message to a message queue of blockchain messages having the same priority identifier. By using five message queues as an example, the five message queues are a message queue a, a message queue b, a message queue c, a message queue d, and a message queue e respectively. It is assumed that the message queue a includes a blockchain message having a priority identifier of 0, the message queue b includes a blockchain message having a priority identifier of 1, the message queue c includes a blockchain message having a priority identifier of 2, and the message queue d and the message queue e are empty. If the priority identifier of the blockchain message received by the relay node is 1, the blockchain message is added to the message queue b. If the priority identifier of the blockchain message received by the relay node is 4, because all priority identifiers of blockchain messages in non-empty message queues are not 4, the blockchain message can be added to an empty message queue, for example, the message queue d or the message queue e.

If no priority is added to the blockchain message received by the relay node, the relay node can set a priority identifier for the blockchain message based on a type of the blockchain message, and add the blockchain node to a message queue corresponding to the identifier. Certainly, another message queue can alternatively be set for storing blockchain messages whose priorities are not set.

A priority of any message queue is consistent with a priority of a blockchain message stored in the any message queue.

A priority of a message queue can be predetermined. The above-mentioned five message queues are still used as an example, and it is assumed that a priority of the message queue a>a priority of the message queue b>a priority of the message queue c>a priority of the message queue d>a priority of the message queue e is set. When a blockchain message is received, the relay node adds the blockchain message to a message queue corresponding to a priority identifier of the blockchain message. For example, a priority of a consensus message is the highest, so that the consensus message is added to the message queue a; and priorities of a transaction broadcast message and a synchronization message are the same and lower than that of the consensus message, then the transaction broadcast message and the synchronization message can be added to the message queue b.

A priority of a message queue can alternatively be determined based on a priority of a blockchain message in the message queue b. The above-mentioned five message queues are still used as an example. If the message queue a includes a transaction broadcast message, the message queue b includes a consensus message, the message queue c stores a synchronization message, and a priority of the consensus message> a priority of the transaction broadcast message> a priority of the synchronization message, such that a priority of the message queue b>a priority of the message queue a>a priority of the message queue c can be determined. In this way, the priorities of the message queues are not uniquely determined, and vary with different priorities of blockchain messages stored in the message queues.

In an embodiment, when obtaining a to-be-transmitted blockchain message based on the message transmission policy, the relay node can obtain the to-be-transmitted blockchain message from a non-empty message queue having a highest priority. The above-mentioned five message queues are still used as an example. If priorities of blockchain messages stored in the message queue a, the message queue b, and the message queue c meet the following condition: a priority A of a blockchain message in the message queue a>a priority B of a blockchain message in the message queue b>a priority C of a blockchain message in the message queue c, the relay node first sequentially obtains to-be-transmitted blockchain messages from the message queue a for transmission, until all blockchain messages in the message queue a have been transmitted; then sequentially obtains to-be-transmitted blockchain messages from the message queue b for transmission, similarly, until all blockchain messages in the message queue b have been transmitted; and then obtains to-be-transmitted blockchain messages from the message queue c. In this way, a blockchain message having a relatively high priority will be transmitted first, and a blockchain message having a relatively low priority is transmitted during an idle interval after the relay node has transmitted the blockchain message having a relatively high priority, thereby ensuring that an important blockchain message is transmitted first, and making full use of network resources.

It should be noted that if a priority of a message queue changes due to addition of a new blockchain message to the message queue, to-be-transmitted messages need to be obtained from the message queue for transmission based on anew priority sequence. For example, a new blockchain message O is added to the message queue d, and priorities of blockchain messages meet the following condition: a priority of the blockchain message O>a priority A of the blockchain message>a priority B of the blockchain message>a priority C of the blockchain message. If before receiving the blockchain message O, the relay node obtains to-be-transmitted blockchain messages from the message queue a, after the blockchain message O is added to the message queue d, the relay node needs to switch to obtain to-be-transmitted blockchain messages from the message queue d, and when all blockchain messages in the message queue d have been transmitted, the relay node continues to obtain to-be-transmitted blockchain messages from the message queue a. The rest can be deduced by analogy.

In another embodiment, when obtaining to-be-transmitted blockchain messages based on the message transmission policy, the relay node can obtain the to-be-transmitted blockchain messages from each of the message queues based on respective message transmission frequencies set for the message queues, the respective message transmission frequencies are positively correlated with respective priorities of corresponding message queue. A higher priority indicates a greater message transmission frequency, and a lower priority indicates a smaller message transmission frequency. The above-mentioned five message queues are still used as an example. If priorities of blockchain messages stored in the message queue a, the message queue b, and the message queue c meet the following condition: a priority A of the blockchain message>a priority B of the blockchain message>a priority C of the blockchain message, message transmission frequencies allocated for the message queue a, the message queue b, and the message queue c can be sequentially, but not limited to, 8000 pieces/s, 3000 pieces/s, and 1000 pieces/s. That is, to-be-transmitted blockchain messages are obtained from the message queue a and transmitted at a rate of 8000 pieces/s, to-be-transmitted blockchain messages are obtained from the message queue b and transmitted at a rate of 3000 pieces/s, and to-be-transmitted blockchain messages are obtained from the message queue c and transmitted at a rate of 1000 pieces/s. The message queue d and the message queue e are empty, so that both message transmission rates thereof are 0 piece/s. Message transmission frequencies of the message queues can be set based on an actual need, which is not limited in this specification.

It should be noted that if a priority of a message queue changes due to addition of a new blockchain message to the message queue, message transmission frequencies need to be reallocated for the message queues based on a new priority sequence. For example, a new blockchain message O is added to the message queue d, and priorities of blockchain messages meet the following condition: a priority of the blockchain message O>a priority A of the blockchain message>a priority B of the blockchain message>a priority C of the blockchain message. After message transmission frequencies are reallocated, message transmission frequencies allocated for the message queue d, the message queue a, the message queue b, and the message queue c can be, for example, 8000 pieces/s, 2000 pieces/s, 1000 pieces/s, and 1000 pieces/s.

Step 204: obtaining identifier information included in the to-be-transmitted blockchain message, and determining a blockchain node corresponding to the identifier information as a target blockchain node corresponding to the to-be-transmitted blockchain message.

A blockchain node can indicate the target blockchain node by adding identifier information to the blockchain message. Correspondingly, when the relay node receives the blockchain message, the relay node can read the identifier information from the blockchain message and determine a blockchain node corresponding to the identifier information as the target blockchain node corresponding to the blockchain message.

It should be noted that the identifier information can include an identifier of one blockchain node, or can include a set identifier of a plurality of blockchain nodes. Correspondingly, the number of target blockchain node corresponding to the to-be-transmitted blockchain message can be one or more.

If the identifier information includes a set identifier, determining the target blockchain node, that is, determining a blockchain node set corresponding to the set identifier, and determining all blockchain nodes pre-registered to the blockchain node set as the target blockchain nodes.

A registration process of a blockchain node is described below:

The blockchain relay communication network can be layered on a control plane and a data plane, and a forwarding control policy of network data can be separated from a data transmission process, so that the forwarding control policy can be freely defined, and the data transmission can be more universal and efficient. For the blockchain relay communication network, the control plane can be understood as a message routing policy, and the data plane refers to transmission of a blockchain message in the blockchain relay communication network. By submitting a registration request, the blockchain node can freely configure a blockchain node set to which the blockchain node pertains based on application (or service) needs, so as to adjust a message routing related to the blockchain node.

Figure 3:
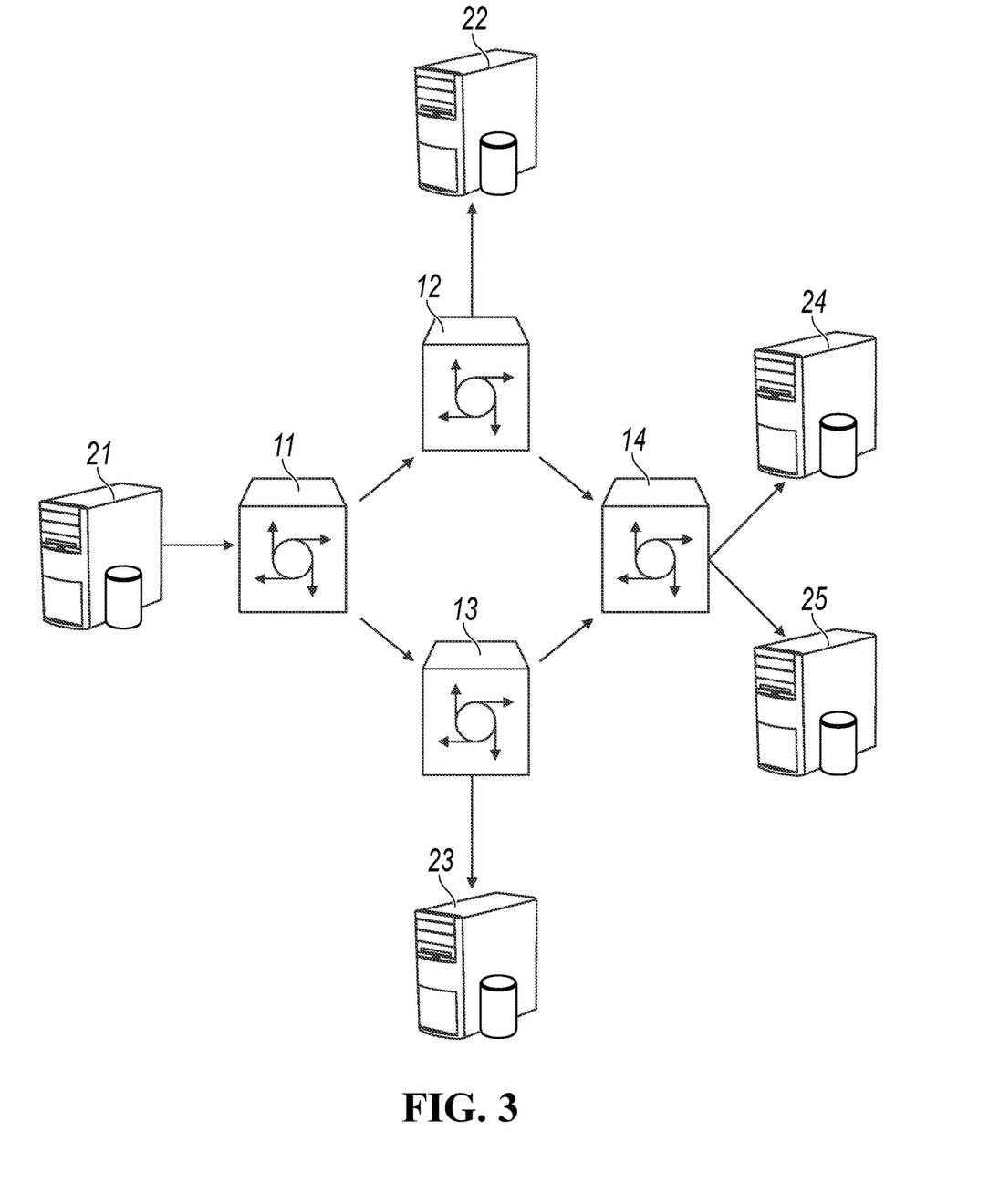
FIG. 3 is a schematic diagram of a message transmission scenario, according to an explanatory embodiment.

Through the previously described manner, the transmission process of the blockchain message in the blockchain relay communication network is optimized. A message transmission scenario shown in FIG. 3 is used as an example. It is assumed that the node 21 in the blockchain network is connected to the relay 11 in the blockchain relay communication network, a node 22 is connected to the relay 12, a node 23 is connected to the relay 13, and nodes 24 and 25 are connected to the relay 14. To facilitate understanding, the previously described gateway (such as the gateway 101) is omitted herein. It is assumed that the node 21 intends to send a blockchain message to the node 22 and the node 24. If the node 22 and the node 24 are added to the same blockchain node set by sending registration requests in advance, the node 21 only needs to mark a target object of the blockchain message as the blockchain node set, to ensure that the blockchain relay communication network only sends the blockchain message to the node 22 and the node 24 that pertain to the blockchain node set. For example, the node 21 sends the blockchain message to the relay 11, the relay 11 forwards the blockchain message to the relay 12, the relay 12 forwards the blockchain message to the node 22 and the relay 14 separately, and the relay 14 forwards the blockchain message to the node 24, thereby avoiding sending the blockchain message to other relay nodes and blockchain nodes to avoid waste of the communication resources.

If the registration request submitted by the blockchain node includes a set identifier, the relay node can register the blockchain node submitting the registration request to a blockchain node set corresponding to the set identifier. If the blockchain node set corresponding to the set identifier is created in advance, the blockchain node is added to the blockchain node set; and if the blockchain node set corresponding to the set identifier is not created in advance, then it is equivalent to creating the blockchain node set and adding the blockchain node to the blockchain node set.

If the registration request does not include a set identifier, the relay node can register the blockchain node initiating the registration request to a default blockchain node set. The default blockchain node set can include all blockchain nodes in the blockchain network to which the blockchain node initiating the registration request pertains; or, the default blockchain node set can be other predefined blockchain node set(s), depending on a predefined policy adopted by the blockchain relay communication network.

When the blockchain node is not added to any blockchain node set, a corresponding routing policy of the blockchain node in the blockchain relay communication network only involves a node ID of the blockchain node and a relay ID of a relay node connected to the blockchain node. For example, a routing policy corresponding to the node 21 in FIG. 3 is "node 21-relay 11", and a routing policy corresponding to the node 22 is "node 22-relay 12", or the like. After the blockchain node is added to a blockchain node set, information related to the blockchain node set is added to the routing policy corresponding to the blockchain node in the blockchain relay communication network. For example, when the node 21 is added to a blockchain node set SID1, the routing policy corresponding to the node 21 can be updated from the "node 21-relay 11" to "SID1/node 21-relay 11", indicating that the node 21 pertains to the blockchain node set SID1.

The same blockchain node can be added to one or more blockchain node sets based on application needs. That is, blockchain nodes included in different blockchain node sets may overlap. For example, a blockchain node set C1 can include the node 21, the node 22, and the node 23, and a blockchain node set C2 can include the node 22, the node 23, the node 24, and the node 25, so that the node 22 and the node 23 pertain to the two blockchain node sets C1 and C2 at the same time.

Step 206: determining a target relay node connected to the target blockchain node in the blockchain relay communication network.

The relay node can generate a routing table for recording the blockchain node set to which each blockchain node pertains and a connection relationship between each blockchain nodes and the relay nodes. The routing table can be, but not limited to, in the form of a tree-type routing table. Correspondingly, the relay node can determine, by querying the routing table, the target blockchain node registered to a target blockchain node set (all the blockchain nodes registered to the target blockchain node set) and the target relay node connected to the target blockchain node in the blockchain relay communication network, so as to transmit the blockchain message to each target blockchain node through the target relay node.

There may be a large number of routing policies in the routing table. If the relay node matches the blockchain message in the full quantity of routing policies every time, too much time may be taken. Therefore, the relay nodes in the blockchain relay communication network can be classified into a plurality of relay sets, and the relay nodes in each relay set maintain two routing tables: a set routing table and a full routing table. The full routing table is used for recording routing policies formed by the registration requests received by all the relay nodes in the blockchain relay communication network. Moreover, each relay set has different set routing tables, and each set routing table is used for recording a routing policy formed by the registration requests directly received by the relay nodes in the corresponding relay set from the connected blockchain nodes. Therefore, two hierarchies of routing tables are maintained by each relay node: after receiving the blockchain message, the relay node first matches in the set routing table maintained by the relay node. If the target relay node can be determined, it is not necessary to use the full routing table. If the target relay node cannot be determined or cannot be fully determined, the relay node further matches in the full routing table to determine the target relay node.

In addition to the two-layer routing formed by the set routing table and the full routing table, other forms can be adopted. For example, a relay node can separately maintain a set routing table corresponding to a relay set in which the relay node is located and a supplementary routing table corresponding to the set routing table, where a union of the set routing table and the supplementary routing table is the full routing table. Therefore, after receiving the blockchain message, the relay node first matches in the set routing table maintained by the relay node. If the target relay node can be determined, it is not necessary to use the supplementary routing table. If the target relay node cannot be determined or cannot be determined fully, the relay node further matches in the supplementary routing table, which can avoid repeated matching of the routing policies in the set routing table as compared with matching in the full routing table.

Step 208: transmitting the blockchain message to the target blockchain node through the target relay node.

After the relay node determines the target relay node, if the relay node pertains to the target blockchain node, the relay node transmits the blockchain message to the target blockchain node based on the target blockchain node connected to the relay node. If the relay node is not the target blockchain node, or there is other target relay node(s) besides the relay node, the relay node transmits the blockchain message to the target relay node, for the target relay node to forward the blockchain message to the connected target blockchain node. When the relay node transmits the blockchain message to the target relay node, if the relay node is directly connected to the target relay node, the blockchain message can be directly transmitted to the target relay node. If the relay node is not directly connected to the target relay node, the relay node can plan a transmission path between the relay node and the target relay node, and send the blockchain message to a relay node at a next hop in the transmission path, for the blockchain message to reach the target relay node along the transmission path.

For example, in the embodiment shown in FIG. 3, it is assumed that the node 21 intends to send a blockchain message to a target blockchain node set, and a member of the target blockchain node set is the node 24: the relay 11 first receives the blockchain message from the node 21, and determines that the target relay node is the relay 14 connected to the node 24, and a route forwarding path between the relay 11 and the relay 14 is "relay 11-relay 12-relay 14", so the relay 11 forwards the blockchain message to the relay 12. After receiving the blockchain message, the relay 12 finds that the target relay node is the relay 14, so the relay 12 forwards the blockchain message to the relay 14. After receiving the blockchain message, the relay 14 finds that the target relay node is the relay 14 and the target blockchain node is the node 24, so the relay 14 forwards the blockchain message to the node 24.

In addition to realizing the transmission of the blockchain message by defining the routing policy by using the blockchain node set, message transmission that is more direct can also be realized between blockchain nodes. Compared with the transmission mode based on the blockchain node set, a difference between the two lies in how to indicate a target object in the blockchain message when the blockchain node generates the blockchain message. Therefore, when the relay node receives a blockchain message sent for any blockchain node, a relay node connected to the any blockchain node in the blockchain relay communication network can be determined and the blockchain message can be transmitted to the any blockchain node through the determined relay node.

Certainly, no matter whether the blockchain node set or the specific blockchain node is indicated in the blockchain message, the technical solution of this specification can make the relay node in the blockchain relay communication network realize targeted message transmission in the process of transmitting the blockchain message, which aims to transmit the blockchain message to the target relay node and then transmit the blockchain message by the target relay node to the blockchain node taking as the target object, without generating unnecessary data interaction between the relay nodes or between the relay nodes and the blockchain nodes. Thus eliminating a blindness of message transmission based on the P2P technology in the related art, accelerating a transmission speed of the blockchain message, and reducing resource consumption of the blockchain relay communication network.

In the above-mentioned embodiments, a high-priority blockchain message is transmitted first by using a plurality of message queues and the message transmission policy. In addition, the blockchain relay communication network takes over intermediate links of communication between the blockchain nodes, which can reduce the communication delay and improve the stability, thereby significantly improving communication quality between the blockchain nodes.

Figure 4:
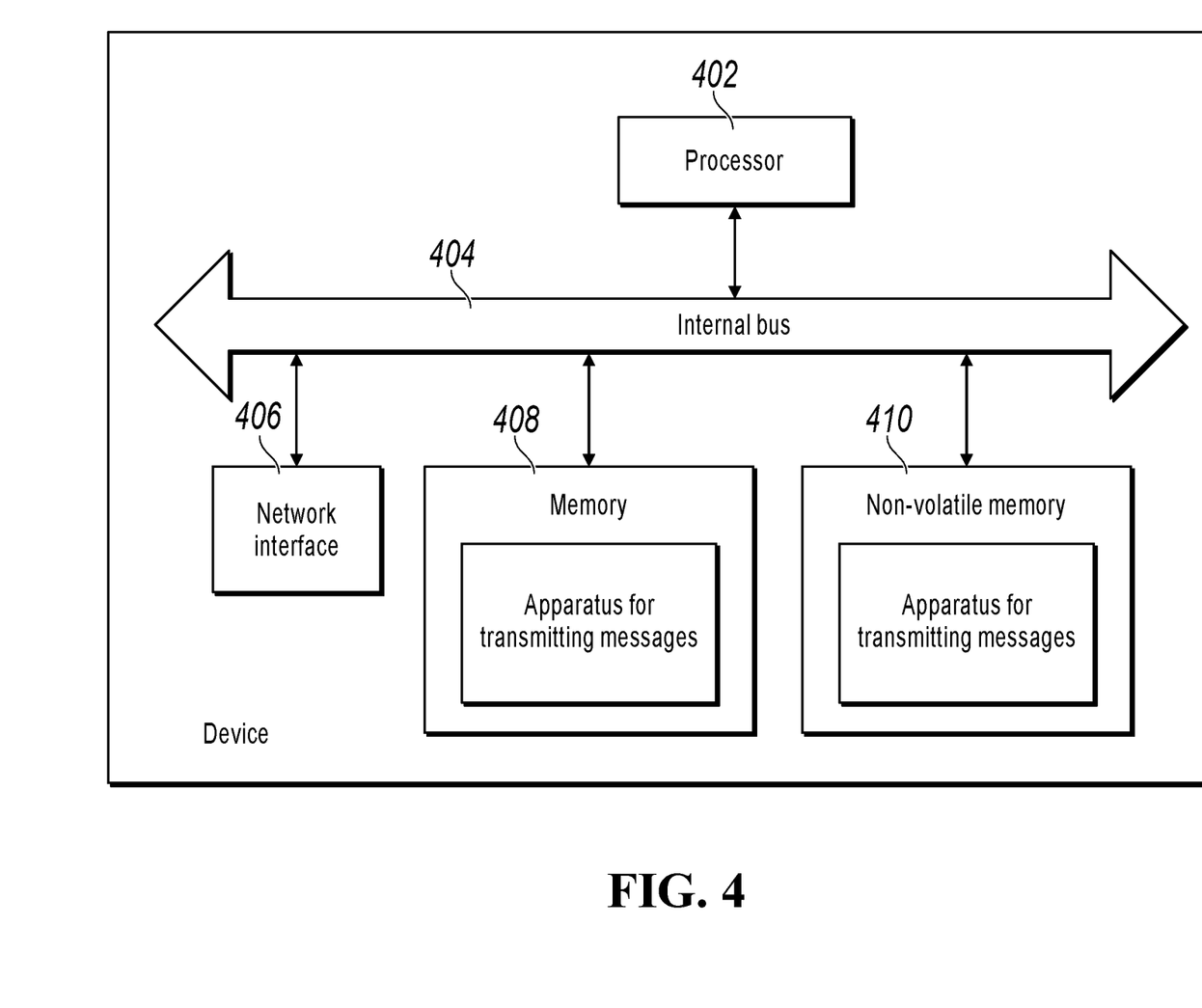
FIG. 4 is a schematic structural diagram of a device, according to an explanatory embodiment.

FIG. 4 is a schematic structural diagram of a device, according to an explanatory embodiment. Referring to FIG. 4, at a hardware level, the device includes a processor 402, an internal bus 404, a network interface 406, an internal memory 408, and a non-volatile memory 410, and certainly can further include hardware needed for other services. The processor 402 reads a corresponding computer program from the non-volatile memory 410 into the memory 408 and then executes the computer program, to form a message transmission apparatus at a logic level. Certainly, in addition to a software implementation, one or more embodiments of this specification do not exclude other implementations, for example, logic devices or a software-hardware combination. That is, execution bodies of the following processing procedures are not limited to each logic unit and can alternatively be hardware or logic devices.

Figure 5:
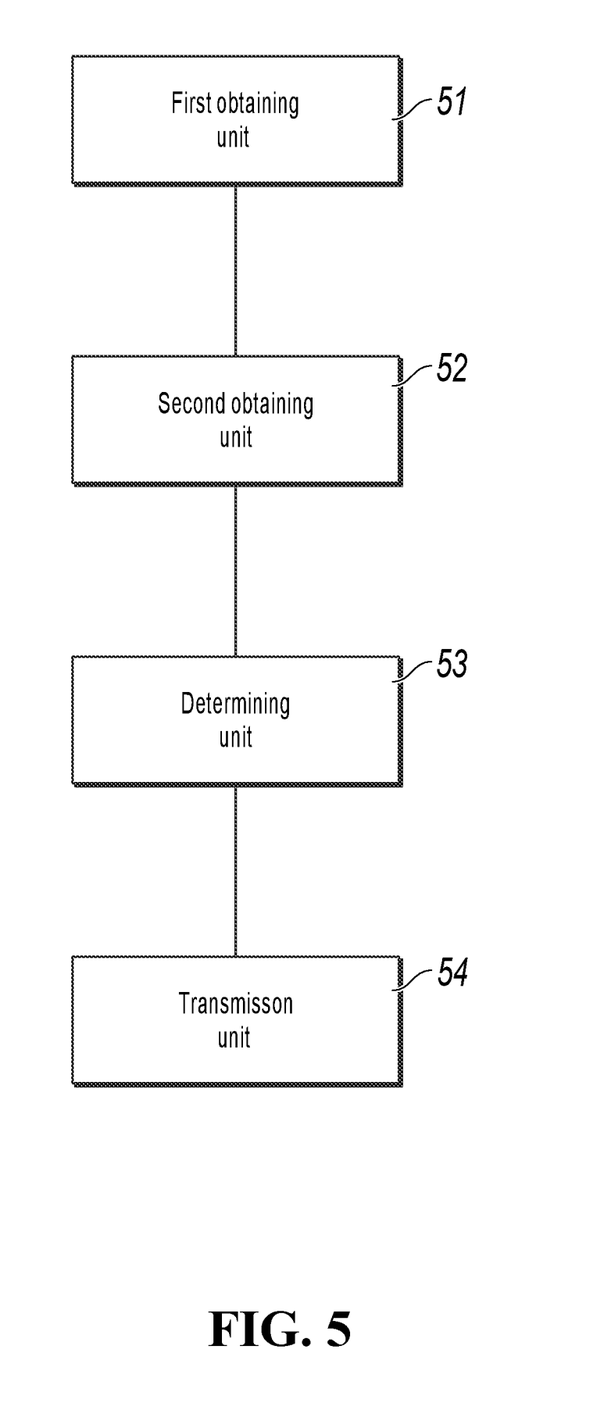
FIG. 5 is a block diagram of an apparatus for transmitting messages, according to an explanatory embodiment.

Referring to FIG. 5, in a software implementation, the apparatus for transmitting messages can include: a first obtaining unit 51, configured to obtain a to-be-transmitted blockchain message from the message queues based on a message transmission policy, the message transmission policy is configured for transmitting a high-priority blockchain message first; a second obtaining unit 52, configured to obtain identifier information included in the to-be-transmitted blockchain message, and determine a blockchain node corresponding to the identifier information as a target blockchain node corresponding to the to-be-transmitted blockchain message; a determining unit 53, configured to determine a target relay node connected to the target blockchain node in the blockchain relay communication network; and a transmission unit 54, configured to transmit the blockchain message to the target blockchain node through the target relay node.

Optionally, the first obtaining unit 51 is specifically configured to: obtain the to-be-transmitted blockchain message from a non-empty message queue having a highest priority, a priority of any message queue is consistent with a priority of a blockchain message stored in the any message queue; or obtain the to-be-transmitted blockchain message from each of the message queues based on respective message transmission frequencies set for the message queues, the respective message transmission frequencies are positively correlated with respective priorities of corresponding message queue.

Optionally, the identifier information includes a set identifier; and when determining the target blockchain node, the second obtaining unit 52 is configured to: determine a blockchain node set corresponding to the set identifier, and determine all blockchain nodes pre-registered to the blockchain node set as the target blockchain node.

Optionally, the determining unit 53 is specifically configured to: determine, by querying a routing table, the target relay node connected to the target blockchain node, the routing table is configured for recording a connection relationship between each blockchain node and relay nodes.

Optionally, the transmission unit 54 is specifically configured to: transmit the blockchain message to the connected target blockchain node; and/or, transmit the blockchain message to the target relay node, for the target relay node to forward the blockchain message to the connected target blockchain node.

Optionally, the priority identifier is determined based on a type of the blockchain message; or the priority identifier is configured for the blockchain message based on a user configuration instruction.

Optionally, the apparatus further includes an addition unit; the determining unit is further configured to, when a blockchain message is received, determine a priority identifier of the blockchain message; and the addition unit is configured to add the blockchain message to a message queue of blockchain messages having the same priority identifier.

The system, the apparatus, the module or the unit described in the previously described embodiments can be specifically implemented by a computer chip or an entity, or implemented by a product having a certain function. A typical implementation device is a computer. A specific form of the computer may be a personal computer, a laptop computer, a cellular phone, a camera phone, a smartphone, a personal digital assistant, a media player, a navigation device, an email transceiver device, a game console, a tablet computer, a wearable device, or a combination of any devices of these devices.

In a typical configuration, the computer includes one or more processors (such as CPUs), one or more input/output interfaces, one or more network interfaces, and one or more memories.

The memory can include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which can implement storage of information by using any method or technology. The information can be computer-readable instructions, a data structure, a program module, or other data. Examples of a storage medium of a computer include, but are not limited to, a phase-change memory (PRAM), a static random-access memory (SRAM), a dynamic random-access memory (DRAM), a RAM of another type, a random access memory (ROM), an electrically erasable programmable read-only memory (EEPROM), a flash memory or another memory technology, a compact disc read-only memory (CD-ROM), a digital versatile disc (DVD) or another optical storage device, a cassette tape, a magnetic disk storage, a quantum memory, a graphene-based storage medium or another magnetic storage device, or any other non-transmission medium, which can be configured to store information accessible by a computing device. Based on limitations of this specification, the computer-readable medium does not include transitory computer-readable media (transitory media), such as a modulated data signal and a modulated carrier.

It should be further noted that the terms "include", "comprise", or any variants thereof are intended to cover a non-exclusive inclusion. Therefore, a process, method, product, or device that includes a series of elements not only includes such elements, but also includes other elements not specifically expressed, or can include inherent elements of the process, method, product, or device. Without further limitation, the element defined by a phrase "include a/an . . . " does not exclude other same elements in the process, method, product or device which include the element.

Embodiments of this specification are described above. Other embodiments fall within the scope of the appended claims. In some cases, the actions or steps recorded in the claims can be performed in sequences different from those in the embodiments and an expected result can still be achieved. In addition, the processes depicted in the accompanying drawings are not necessarily performed in the specific order or successively to achieve an expected result. In some implementations, multitasking and parallel processing can be feasible or beneficial.

The terms used in one or more embodiments of this specification are merely used to describe the embodiments but are not intended to limit one or more embodiments of this specification. The "a" and "the" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first," "second," "third," and the like may be used to describe various information in one or more embodiments of this specification, such information should not be limited to these terms. These terms are merely used to distinguish between information of the same type. For example, without departing from the scope of one or more embodiments of this specification, first information can also be referred to as second information. Similarly, second information can also be referred to as first information. Depending on the context, for example, the word "if" used herein can be interpreted as "while" or "when," or "in response to determination."

The previously described descriptions are merely preferred embodiments of one or more embodiments of this specification, but are not intended to limit the one or more embodiments of this specification. Any modification, equivalent replacement, or improvement made within the spirit and principle of one or more embodiments of this specification shall fall within the protection scope of the one or more embodiments of this specification.

What is claimed is:

1. A computer-implemented method, comprising:
   determining, in response to receiving a blockchain message, one or more message priority identifiers of the blockchain message;
   adding the blockchain message to two or more message queues stored in a relay node, each message queue comprising one or more blockchain messages corresponding to a same message priority identifier of the one or more message priority identifiers;
   determining a to-be-transmitted blockchain message from the two or more message queues stored in the relay node in a blockchain relay communication network based on a message transmission policy, the message transmission policy being configured to transmit blockchain messages from relay nodes in the blockchain relay communication network based upon the one or more message priority identifiers identifying one or more target blockchain nodes in the blockchain relay communication network, wherein the one or more message priority identifiers are configured based upon a user configuration instruction and represents a priority of a blockchain message to be transmitted in the blockchain relay communication network;

generating a routing table for recording a blockchain node set to which each blockchain node pertains and a connection relationship between each blockchain node and the relay nodes, wherein the routing table is in a form of a tree-type routing table;

obtaining an identifier from the to-be-transmitted blockchain message;

determining the one or more target blockchain nodes based on the identifier;

determining a target relay node connected to the one or more target blockchain nodes in the blockchain relay communication network;

transmitting, based upon the identifier, the to-be-transmitted blockchain message to the one or more target blockchain nodes through the target relay node; and in response to determining that the relay node is not directly connected to the target relay node:
  determining a transmission path between the relay node and the target relay node; and
  sending the to-be-transmitted blockchain message to a relay node at a next hop in the transmission path.

2. The computer-implemented method of claim 1, wherein determining a to-be-transmitted blockchain message from the two or more message queues comprises:
  obtaining the to-be-transmitted blockchain message from each of the two or more message queues based on respective message transmission frequencies set for the two or more message queues, each message transmission frequency of the message transmission frequencies set is positively correlated to a corresponding message queue priority of a corresponding message queue.

3. The computer-implemented method of claim 1, wherein the identifier comprises a set identifier; and
  determining the one or more target blockchain nodes comprises:
    determining the blockchain node set corresponding to the set identifier; and
      determining one or more of a plurality of blockchain nodes pre-registered to the blockchain node set as the one or more target blockchain nodes in the blockchain relay communication network.

4. The computer-implemented method of claim 1, wherein determining a target relay node connected to the one or more target blockchain nodes in the blockchain relay communication network comprises:
  determining, by querying the routing table, the target relay node connected to the one or more target blockchain nodes, wherein the routing table is configured to record a connection relationship between each of a plurality of blockchain nodes and a corresponding relay node of a plurality of relay nodes in the blockchain relay communication network.

5. The computer-implemented method of claim 1, wherein transmitting the to-be-transmitted blockchain message to the one or more target blockchain nodes through the target relay node, comprises:
  transmitting the to-be-transmitted blockchain message directly to the one or more target blockchain nodes through the target relay node; or
  transmitting the to-be-transmitted blockchain message to the target relay node, for the target relay node to forward the to-be-transmitted blockchain message to the one or more target blockchain nodes.

6. The computer-implemented method of claim 1, wherein determining a to-be-transmitted blockchain message from the two or more message queues comprises:
  obtaining the to-be-transmitted blockchain message from a message queue having a highest message queue priority among a plurality of message queue priorities, wherein a message queue priority corresponds to a blockchain message priority of a blockchain message stored in a message queue.

7. A non-transitory, computer-readable medium storing one or more instructions executable by a computer system to perform operations comprising:
  determining, in response to receiving a blockchain message, one or more message priority identifiers of the blockchain message;
  adding the blockchain message to two or more message queues stored in a relay node, each message queue comprising one or more blockchain messages corresponding to a same message priority identifier of the one or more message priority identifiers;
  determining a to-be-transmitted blockchain message from the two or more message queues stored in the relay node in a blockchain relay communication network based on a message transmission policy, the message transmission policy being configured to transmit blockchain messages from relay nodes in the blockchain relay communication network based upon the one or more message priority identifiers identifying one or more target blockchain nodes in the blockchain relay communication network, wherein the one or more message priority identifiers are configured based upon a user configuration instruction and represents a priority of a blockchain message to be transmitted in the blockchain relay communication network;
  generating a routing table for recording a blockchain node set to which each blockchain node pertains and a connection relationship between each blockchain node and the relay nodes, wherein the routing table is in a form of a tree-type routing table;
  obtaining an identifier from the to-be-transmitted blockchain message;
  determining the one or more target blockchain nodes based on the identifier;
  determining a target relay node connected to the one or more target blockchain nodes in the blockchain relay communication network;
  transmitting, based upon the identifier, the to-be-transmitted blockchain message to the one or more target blockchain nodes through the target relay node; and
  in response to determining that the relay node is not directly connected to the target relay node:
    determining a transmission path between the relay node and the target relay node; and
    sending the to-be-transmitted blockchain message to a relay node at a next hop in the transmission path.

8. The non-transitory, computer-readable medium according to claim 7, wherein determining a to-be-transmitted blockchain message from the two or more message queues includes operations comprising:
  obtaining the to-be-transmitted blockchain message from each of the two or more message queues based on respective message transmission frequencies set for the two or more message queues, each message transmission frequency of the message transmission frequencies set is positively correlated to a corresponding message queue priority of a corresponding message queue.

9. The non-transitory, computer-readable medium according to claim 7, wherein the identifier comprises a set identifier; and
determining the one or more target blockchain nodes includes operations comprising:
determining the blockchain node set corresponding to the set identifier; and
determining one or more of a plurality of blockchain nodes pre-registered to the blockchain node set as the one or more target blockchain nodes.

10. The non-transitory, computer-readable medium according to claim 7, wherein determining a target relay node connected to the one or more target blockchain nodes in the blockchain relay communication network includes operations comprising:
determining, by querying the routing table, the target relay node connected to the one or more target blockchain nodes, wherein the routing table is configured to record a connection relationship between each of a plurality of blockchain nodes and a corresponding relay node of a plurality of relay nodes in the blockchain relay communication network.

11. The non-transitory, computer-readable medium according to claim 7, wherein transmitting the to-be-transmitted blockchain message to the one or more target blockchain nodes through the target relay node, comprises:
transmitting the to-be-transmitted blockchain message directly to the one or more target blockchain nodes through the target relay node; or
transmitting the to-be-transmitted blockchain message to the target relay node, for the target relay node to forward the blockchain message to the one or more target blockchain nodes.

12. The non-transitory, computer-readable medium according to claim 7, wherein determining a to-be-transmitted blockchain message from the two or more message queues includes operations comprising:
obtaining the to-be-transmitted blockchain message from a message queue having a highest message queue priority among a plurality of message queue priorities, wherein a message queue priority corresponds to a blockchain message priority of a blockchain message stored in a message queue.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
determining, in response to receiving a blockchain message, one or more message priority identifiers of the blockchain message;
adding the blockchain message to two or more message queues stored in a relay node, each message queue comprising one or more blockchain messages corresponding to a same message priority identifier of the one or more message priority identifiers;
determining a to-be-transmitted blockchain message from the two or more message queues stored in the relay node in a blockchain relay communication network based on a message transmission policy, the message transmission policy being configured to transmit blockchain messages from relay nodes in the blockchain relay communication network based upon the one or more message priority identifiers identifying one or more target blockchain nodes in the blockchain relay communication network, wherein the one or more message priority identifiers are configured based upon a user configuration instruction and represents a priority of a blockchain message to be transmitted in the blockchain relay communication network;
generating a routing table for recording a blockchain node set to which each blockchain node pertains and a connection relationship between each blockchain nodes and the relay nodes wherein the routing table is in a form of a tree-type routing table;
obtaining an identifier from the to-be-transmitted blockchain message;
determining the one or more target blockchain nodes based on the identifier;
determining a target relay node connected to the one or more target blockchain nodes in the blockchain relay communication network;
transmitting, based upon the identifier, the to-be-transmitted blockchain message to the one or more target blockchain nodes through the target relay node; and
in response to determining that the relay node is not directly connected to the target relay node:
determining a transmission path between the relay node and the target relay node; and
sending the to-be-transmitted blockchain message to a relay node at a next hop in the transmission path.

14. The computer-implemented system of claim 13, wherein determining a to-be-transmitted blockchain message from the two or more message queues includes one or more operations comprising:
obtaining the to-be-transmitted blockchain message from a message queue having a highest message queue priority among a plurality of message queue priorities, wherein a message queue priority corresponds to a blockchain message priority of a blockchain message stored in a message queue.

15. The computer-implemented system of claim 13, wherein determining a to-be-transmitted blockchain message from the two or more message queues includes one or more operations comprising:
obtaining the to-be-transmitted blockchain message from each of the two or more message queues based on respective message transmission frequencies set for the two or more message queues, each message transmission frequency of the message transmission frequencies set is positively correlated to a corresponding message queue priority of a corresponding message queue.

16. The computer-implemented system of claim 13, wherein the identifier comprises a set identifier; and
determining the one or more target blockchain nodes includes one or more operations comprising:
determining the blockchain node set corresponding to the set identifier; and
determining one or more of a plurality of blockchain nodes pre-registered to the blockchain node set as the one or more target blockchain nodes.

17. The computer-implemented system of claim 13, wherein determining a target relay node connected to the one or more target blockchain nodes in the blockchain relay communication network includes one or more operations comprising:
determining, by querying the routing table, the target relay node connected to the one or more target blockchain nodes, wherein the routing table is configured to record a connection relationship between each of a plurality of blockchain nodes and a corresponding relay node of a plurality of relay nodes in the blockchain relay communication network.

\* \* \* \* \*

UNITED STATES PATENT AND TRADEMARK OFFICE
CERTIFICATE OF CORRECTION

PATENT NO. : 11,388,229 B2  
APPLICATION NO. : 17/362867  
DATED : July 12, 2022  
INVENTOR(S) : Jiang Wang, Chao Zeng and He Sun It is certified that error appears in the above-identified patent and that said Letters Patent is hereby corrected as shown below:

On the Title Page

Item (73), Line 2, delete "Ltd." and insert -- Ltd., Zhejiang (CN) --, therefor.

In the Claims

Column 16, Line 9, Claim 13, delete "nodes" and insert -- node --, therefor.

Column 16, Line 10, Claim 13, delete "nodes" and insert -- nodes, --, therefor.

Signed and Sealed this  
Eleventh Day of October, 2022

Katherine Kelly Vidal  
*Director of the United States Patent and Trademark Office*